US011034589B2

(12) United States Patent
Ohtake et al.

(10) Patent No.: US 11,034,589 B2
(45) Date of Patent: *Jun. 15, 2021

(54) CERIUM OXIDE PARTICLES AND METHOD FOR PRODUCTION THEREOF

(71) Applicant: RHODIA OPERATIONS, Paris (FR)

(72) Inventors: Naotaka Ohtake, Tokushima (JP); Mitsuhiro Okazumi, Tokushima (JP); Fabien Ocampo, Audun-le-Tiche (FR)

(73) Assignee: RHODIA OPERATIONS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,111

(22) Filed: Nov. 30, 2018

(65) Prior Publication Data

US 2019/0330073 A1    Oct. 31, 2019

Related U.S. Application Data

(63) Continuation of application No. 15/526,610, filed as application No. PCT/EP2015/076272 on Nov. 10, 2015, now Pat. No. 10,160,658.

(30) Foreign Application Priority Data

Nov. 12, 2014    (EP) .................................... 14290344

(51) Int. Cl.
| | | |
|---|---|---|
| *C01F 17/00* | (2020.01) | |
| *C01F 17/206* | (2020.01) | |
| *B01J 20/28* | (2006.01) | |
| *B01J 20/30* | (2006.01) | |
| *B01J 37/03* | (2006.01) | |
| *B01J 35/10* | (2006.01) | |
| *B01D 53/94* | (2006.01) | |
| *B01J 20/06* | (2006.01) | |
| *B01J 23/10* | (2006.01) | |
| *C09K 3/14* | (2006.01) | |
| *C01F 17/235* | (2020.01) | |
| *C01F 17/241* | (2020.01) | |
| *B01J 37/08* | (2006.01) | |
| *F01N 3/08* | (2006.01) | |
| *B01J 35/02* | (2006.01) | |

(52) U.S. Cl.
CPC ........ *C01F 17/206* (2020.01); *B01D 53/9422* (2013.01); *B01J 20/06* (2013.01); *B01J 20/28057* (2013.01); *B01J 20/28059* (2013.01); *B01J 20/28061* (2013.01); *B01J 20/28069* (2013.01); *B01J 20/28073* (2013.01); *B01J 20/28076* (2013.01); *B01J 20/3071* (2013.01); *B01J 20/3078* (2013.01); *B01J 23/10* (2013.01); *B01J 35/1014* (2013.01); *B01J 35/1019* (2013.01); *B01J 35/1042* (2013.01); *B01J 35/1047* (2013.01); *B01J 37/031* (2013.01); *B01J 37/08* (2013.01); *C01F 17/235* (2020.01); *C01F 17/241* (2020.01); *C09K 3/1409* (2013.01); *F01N 3/0842* (2013.01); *B01D 2255/2065* (2013.01); *B01D 2255/908* (2013.01); *B01J 35/023* (2013.01); *C01P 2006/12* (2013.01); *C01P 2006/13* (2013.01); *C01P 2006/14* (2013.01)

(58) Field of Classification Search
CPC ............ C01F 17/0018; C01F 17/0093; C09K 3/1409; B01J 20/28059; B01J 20/28061; B01J 20/28078; B01J 20/28076; B01J 37/08; B01J 37/031; B01J 35/1014; B01J 35/1019; B01J 35/1042; B01J 35/1047; B01J 23/10; B01D 2255/908; B01D 2255/206–2068
USPC ............ 423/21.1, 263; 51/309; 502/302–304
See application file for complete search history.

(56) References Cited

U.S. PATENT DOCUMENTS

| | | | |
|---|---|---|---|
| 7,361,322 B2 | 4/2008 | Aozasa et al. | |
| 10,160,658 B2 * | 12/2018 | Ohtake | ............... B01J 35/1019 |
| 2002/0032989 A1 | 3/2002 | Kido et al. | |
| 2004/0234438 A1 | 11/2004 | Dai et al. | |
| 2007/0081931 A1 | 4/2007 | Cho et al. | |
| 2007/0148072 A1 | 6/2007 | Okamoto et al. | |
| 2008/0050593 A1 | 2/2008 | Okamoto | |
| 2009/0220398 A1 | 9/2009 | Verdier et al. | |

(Continued)

FOREIGN PATENT DOCUMENTS

| | | |
|---|---|---|
| AU | 8280387 A | 6/1988 |
| EP | 1435338 A1 | 7/2004 |

(Continued)

OTHER PUBLICATIONS

D. Terribile et al.: "The Synthesis and Characterization of Mesoporous High-Surface Area Ceria Prepared Using a Hybrid Organic/Inorganic Route", Journal of Catalysis, Academic Press, Duluth, MN, US, vol. 178, No. 1, Aug. 15, 1998, pp. 299-308.

(Continued)

*Primary Examiner* — Steven J Bos
(74) *Attorney, Agent, or Firm* — Osha Bergman Watanabe & Burton LLP

(57) ABSTRACT

The present invention relates to cerium oxide particles that have excellent heat resistance especially useful for catalysts, functional ceramics, solid electrolyte for fuel cells, polishing, ultraviolet absorbers and the like, and particularly suitable for use as a catalyst or co-catalyst material, for instance in catalysis for purifying vehicle exhaust gas. The present invention also relates to a method for preparing such cerium oxide particles, and a catalyst, such as for purifying exhaust gas, utilizing these cerium oxide particles.

12 Claims, No Drawings

(56) References Cited

U.S. PATENT DOCUMENTS

2012/0129690 A1 5/2012 Larcher et al.
2012/0316059 A1 12/2012 Ohtake et al.
2013/0052108 A1 2/2013 Ifrah et al.
2017/0001172 A1 1/2017 Zhao et al.

FOREIGN PATENT DOCUMENTS

| EP | 2518018 A1 | 10/2012 |
| JP | 200716169 A | 1/2007 |
| WO | 9845212 A1 | 10/1998 |
| WO | 2013092557 A1 | 6/2013 |
| WO | 2013093557 A1 | 6/2013 |

OTHER PUBLICATIONS

Brunauer Stephen et al.: "Adsorption of Gases in Multimolecular Layers", Journal of the American Society, vol. 60, No. 2, Feb. 1, 1938, pp. 309-319.

* cited by examiner

CERIUM OXIDE PARTICLES AND METHOD FOR PRODUCTION THEREOF

CROSS-REFERENCE TO RELATED APPLICATIONS

The present application is a continuation of U.S. application Ser. No. 15/526,610, filed on May 12, 2017 and issued as U.S. Pat. No. 10,160,658, which is a U.S. national phase entry under 35 U.S.C. § 371 of International Application No. PCT/EP2015/076272, filed on Nov. 10, 2015, which claims priority to European application No. 14290344.2, filed on Nov. 12, 2014. The entire content of each of these applications is explicitly incorporated herein by reference.

The present invention relates to cerium oxide particles that have excellent heat resistance especially useful for catalysts, functional ceramics, solid electrolyte for fuel cells, polishing, ultraviolet absorbers and the like, and particularly suitable for use as a catalyst or co-catalyst material, for instance in catalysis for purifying vehicle exhaust gas. The present invention also relates to a method for preparing such cerium oxide particles, and a catalyst, such as for purifying exhaust gas, utilizing these cerium oxide particles.

PRIOR ART

The following discussion of the prior art is provided to place the invention in an appropriate technical context and enable the advantages of it to be more fully understood. It should be appreciated, however, that any discussion of the prior art throughout the specification should not be considered as an express or implied admission that such prior art is widely known or forms part of common general knowledge in the field.

Catalysts for purifying vehicle exhaust gas are composed of a catalytic metal such as platinum, palladium, or rhodium, and a co-catalyst for enhancing the catalytic action of such metal, both supported on a catalyst support made of, for example, alumina or cordierite. As such a co-catalyst material are used cerium oxide-containing materials, which have the properties of absorbing oxygen under the oxidizing atmosphere and desorbing oxygen under the reducing atmosphere, originated in cerium oxide, i.e., oxygen absorbing and desorbing capability. With this oxygen absorbing and desorbing capability, the cerium oxide-containing materials purify noxious components in exhaust gas such as hydrocarbons, carbon monoxide, and nitrogen oxides at excellent efficiency. As such, large quantities of the cerium oxide-containing materials are used as a co-catalyst.

It is most critical for activating the function of such cerium oxide-containing co-catalyst material to keep the co-catalyst at a high temperature. Low temperature of the exhaust gas, for example at engine start-up, will result in low purifying efficiency. Vehicle manufacturers are presently trying to solve this problem by placing the catalyst system close to the engine for introducing hot exhaust gas right after its emission from the engine into the catalyst system. There is also a demand for co-catalyst materials that are activated at lower temperatures.

In general, efficiency of exhaust gas treatment with a catalyst is proportional to the contact area between the active phase of the catalyst and the exhaust gas, and to the oxygen absorbing and desorbing capability of the co-catalyst material, such as cerium oxide. Thus the co-catalyst material is required to have a sufficiently large specific surface area and a sufficiently high oxygen absorbing and desorbing capability, as well as high activity at lower temperatures.

For solving these problems, U.S. Pat. No. 7,361,322 B2 proposes a method for obtaining a cerium oxide having good heat resistance with a specific surface area higher than 30.0 $m^2/g$ after calcination at 900° C. for 5 hours, especially around 40-50 $m^2/g$, comprising the steps of:

(a) providing a cerium solution wherein not less than 90 mol % of the cerium are tetravalent cerium cations, said cerium solution having a cerium concentration of 10 to 60 g/L in terms of cerium oxide;

(b) holding said cerium solution prepared in step (a) at 60 to 220° C. under heating;

(c) cooling said heated cerium solution;

(d) adding a precipitant to said cooled cerium solution to obtain a precipitate; and (e) calcining said precipitate.

However it appears that heat resistance of specific surface area of these cerium oxides obtained by this process are still not sufficient.

Also, heat resistance of total pore volume has also come to be required in addition to heat resistance of specific surface area of catalyst supports. High heat resistance of total pore volume usually means that decrease ratio of pore volume in comparison of two different ageing conditions of catalyst supports, such as fresh and 800° C., is small. In the case of loading an active species in the form of a precious metal, such as active metal, onto a catalyst support, the precious metal is loaded with good dispersibility into pores. Thus, a cerium oxide having a large pore volume even at high temperatures is desirable.

There is still a need to provide cerium oxides having higher heat resistance and oxygen absorbing and desorbing capability useful as a catalyst or a co-catalyst material suitable for a catalyst, such as for purifying exhaust gas.

Invention

It is therefore an object of the present invention to provide cerium oxide (cerium(IV) oxide) that has excellent heat resistance and absorbing and desorbing capability, useful for catalysts, functional ceramics, solid electrolyte for fuel cells, polishing, ultraviolet absorbers and the like, and particularly suitable for use as a catalyst or co-catalyst material, particularly in catalysis for purifying vehicle exhaust gas. Cerium oxides particles of the present invention also provide high heat resistance of total pore volume and specific surface area. Cerium oxides particles of the invention are in particular capable of maintaining a large specific surface area even in use in a high temperature environment. These cerium oxide particles are also capable of exhibiting high oxygen absorbing and desorbing capability in a lower temperature range. Invention also concerns a method for preparing these cerium oxide particles, and a catalyst for purifying exhaust gas utilizing said cerium oxide particles.

Cerium oxide particles of the invention also provide a high NOx capture performance, permitting then reduction of NOx emission from automobiles in order to follow stringent pollutants regulations. These cerium oxide particles are then also useful for NOx trap (LNT) catalysts.

The present invention then concerns cerium oxide particles having the following properties:

a specific surface area (SBET) comprised between 80 and 120 $m^2/g$ after calcination at 800° C. for 2 hours, under air;

a specific surface area (SBET) comprised between 55 and 80 $m^2/g$ after calcination at 900° C. for 5 hours, under air;

a total pore volume comprised between 0.9 and 1.6 ml/g after calcination at 800° C. for 2 hours, under air; and a total pore volume comprised between 0.85 and 1.5 ml/g after calcination at 900° C. for 5 hours, under air.

The present invention also concerns a method for preparing cerium oxide particles, comprising at least the steps of:

(a) providing a cerium salt solution comprising anions and cations, wherein between 90 and 100 mol % of the cerium cations are tetravalent cerium cations;

(b) heating said cerium salt solution at a temperature comprised between 60 and 220° C. in order to obtain a suspension comprising a liquid medium and a precipitate;

(c) decreasing the concentration of anions from the cerium salt present in the liquid medium between 10 and 90 mol %, in comparison with said anions comprised in the liquid medium in step (b);

(d) heating the suspension obtained in step (c) at a temperature comprised between 100 and 300° C.;

(e) optionally cooling the suspension obtained in the step (d);

(f) bringing said suspension into contact with a basic compound;

(g) optionally separating off the precipitate from the liquid medium;

(h) adding an organic texturing agent to the suspension obtained in step (f) or the precipitate obtained in step (g);

(i) optionally separating off the precipitate from the liquid medium; and (j) calcining the precipitate obtained at the end of step (h) or obtained at step (i) to obtain cerium oxide particles; said process of the invention comprising at least said step (g) and/or at said step (i).

The invention also concerns cerium oxide particles susceptible to be obtained by this process.

Other characteristics, details and advantages of the invention will emerge even more fully upon reading the description which follows.

Definitions

Throughout the description, including the claims, the term "comprising one" should be understood as being synonymous with the term "comprising at least one", unless otherwise specified, and "between" should be understood as being inclusive of the limits.

It is specified that, in the continuation of the description, unless otherwise indicated, the values at the limits are included in the ranges of values which are given.

The contents are given as oxides, unless otherwise indicated. The cerium oxide is in the form of cerium oxide ($CeO_2$).

In the continuation of the description, the term "specific surface area" is understood to mean the BET specific surface area determined by nitrogen adsorption in accordance with standard ASTM D 3663-78 laid down from the Brunauer-Emmett-Teller method described in the periodical "The Journal of the American Chemical Society, 60, 309 (1938)".

As used herein, the term "alkyl" groups is intended to mean: a saturated aliphatic hydrocarbon-based group containing between 1 and 22 carbon atoms, advantageously between 1 and 10 carbon atoms, of formula $C_nH_{2n+1}$, obtained by removing a hydrogen from an alkane. The alkyl group may be linear or branched. By way of example, the alkyl groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. In complex structures, the chains may be branched or bridged.

DETAILS OF THE INVENTION

According to the present method, first a cerium salt solution, comprising at least anions and cations, such as cerium cations, wherein between 90 and 100 mol % of the cerium cations are tetravalent is provided in step (a). In step (a), the cerium salt solution, may preferably be a cerium nitrate solution, a cerium ammonium nitrate solution, a cerium sulfate solution and/or a cerium ammonium sulfate solution. Cerium salts are ionic compounds usually resulting from the neutralization reaction of an acid and a base or dissolution of a cerium compound, such as cerium hydroxide, with an acid. They are composed of cerium cations and anions so that the product is electrically neutral. Said cerium salt solution is preferably an aqueous cerium salt solution in which the liquid medium is water.

Cerium salt solution of the present invention may have a cerium cations concentration comprised between 5 and 150 g/L expressed in terms of cerium oxide. For instance, a concentration of 225 g/L of cerium nitrate corresponds to 100 g/L of $CeO_2$; a concentration of 318 g/L of cerium ammonium nitrate corresponds to 100 g/L of $CeO_2$; a concentration of 193 g/L of cerium sulfate corresponds to 100 g/L of $CeO_2$; a concentration of 270 g/L of cerium ammonium sulfate corresponds to 100 g/L of $CeO_2$.

The cerium salt concentration of the cerium solution may be adjusted between 10 and 120 g/L, more preferably between 15 and 100 g/L, in terms of cerium oxide, usually with water, preferably with deionized water.

Cerium salt solution in step (a) may have an initial acid concentration usually between 0.01 and 1 N. Acids, such as $HNO_3$ or $H_2SO_4$, may come from the cerium salt raw material solution or added as a stabilizer of the solution.

According to the present method, next the cerium salt solution prepared in step (a) is held between 60 and 220° C. under heating to cause reaction of the cerium solution in step (b), in order to obtain a suspension comprising a liquid medium and a precipitate especially comprising cerium hydroxide. Any reaction vessel may be used in step (b) without critical limitation, and either a sealed vessel or an open vessel may be used. Specifically, an autoclave reactor may preferably be used.

In step (b), the temperature is comprised between 60 and 220° C., preferably between 80 and 180° C., more preferably between 90 and 160° C. Duration of heat treatment is usually between 10 minutes and 48 hours, preferably between 30 minutes and 36 hours, more preferably between 1 hour and 24 hours. If the cerium solution is not sufficiently held under heating, the crystallinity of the precipitate may not be improved, resulting in insufficient heat resistance of the objective cerium oxide.

In step (c), the concentration of the anions from the cerium salt present in the liquid medium is decreased between 10 and 90 mol %, preferably between 15 and 85 mol %, in comparison with anions comprised in the liquid medium in step (b). If the same amount of anions is present in step (a) and (b), the decrease of anions in the liquid medium in step (c) may be calculated in comparison with anions comprised in the liquid medium in step (a) or (b).

Anions from the cerium salts may be for instance nitrate from cerium nitrate or sulfate from cerium sulfate.

This decrease of anions concentration present in the liquid medium may be obtained by at least one of the following methods:
- addition of water, preferably deionized water, to the suspension obtained in step (b); and/or
- removing at least a part of the liquid medium from the suspension obtained in step (b) and then adding water, preferably deionized water, to the medium. Said medium is defined according to partial removal or complete removal of liquid medium as previously expressed; ie. medium may be a precipitate in case of complete removal of liquid medium in step or rather a mixture of precipitate and liquid medium in case of partial removal of liquid medium.

Separation of the liquid medium from the precipitate may be carried out, for example, by Nutsche filter method, centrifuging, filter pressing, or decantation.

According to the invention, partial removal or complete removal of liquid medium is understood to mean that the liquid medium is partially, or completely removed from the precipitate. For example between 10 and 100% by weight, preferably between 10 and 90% by weight, more preferably between 15 and 95% by weight, especially between 20 and 90% by weight, of the liquid medium present in step (b) may be removed in step (c).

Decrease of concentration of anions present in the liquid medium in step (c) in comparison with anions comprised in the liquid medium in step (b), may be calculated as follows in case of cerium nitrate:

Materials at the start of step (a) are $Ce(IV)(NO_3)_4$ and $Ce(III)(NO_3)_3$ and optionally $HNO_3$.

1. Calculation of Total Number of $NO_3^-$ Ions (Mol)

$$NO_3^- \text{ (mol)} = A/172.12*[B/100*4+(100-B)/100*3]+C=D$$

wherein:
A is quantity of cerium cations in terms of $CeO_2$ (gram), in step (a)
B is percentage of tetravalent cerium cations per total cerium cations, at the start of step (b)
C is quantity of $HNO_3$ (mol) if any, in step (a)

2. Calculation of $NO_3^-$ Concentration in Step (b)

$$[NO_3^-] \text{ (mol/l)} = D/E$$

wherein E is volume (liter) of reaction medium in step (b). B may be measured directory such as using measuring cylinder, or gauge.

3. Calculation of $NO_3^-$ Concentration in Step (c)

$$[NO_3^-] \text{ (mol/l)} = F/G$$

F is quantity of $NO_3^-$ ions (mol). F=D if the liquid medium is not removed. F=D*removal ratio of liquid medium if the liquid medium is removed.
G is volume (liter) after adding of water.

4. Decrease Ratio of $NO_3^-$ Concentration
decrease ratio of $[NO_3^-]$ (%) = $[NO_3^-]$ in step (c)/$[NO_3^-]$ in step (b)*100 = (F/G)/(D/E)*100

It is also possible to proceed with a direct measurement of $NO_3^-$ concentration of step (b) and (c). $NO_3^-$ concentration can be analyzed by ion chromatography or adsorptiometer, both apparatus being commonly used to analyze $NO_3^-$ concentration in the liquid medium. A part of the liquid medium is put in the analyzer to automatically measure the $NO_3^-$ concentration. It is then possible to compare the both $NO_3^-$ concentrations to calculate the decrease ratio of $NO_3^-$ concentration.

In step (d), the suspension is heated at a temperature comprised between 100 and 300° C., preferably comprised between 110 and 150° C. Any reaction vessel may be used without critical limitation, and either a sealed vessel or an open vessel may be used. Specifically, an autoclave reactor may preferably be used. The duration of heat treatment is usually between 10 minutes and 48 hours, preferably between 30 minutes and 36 hours.

Following step (d), the heated suspension may be cooled in an optional step (e). The suspension may usually be cooled under stirring. Means for cooling are not critical, and it may be cooling in an atmosphere or forced cooling with cooling tube. The temperature of the suspension after cooling may be comprised between 20 and 90° C.

According to step (f), a basic compound is then added to the suspension, or the suspension having been cooled.

This basic compound may be for example sodium hydroxide, potassium hydroxide, an aqueous ammonia solution, ammonia gas, or mixtures thereof, with an aqueous ammonia solution being preferred. The basic compound may be added by first preparing an aqueous solution of the basic compound at a suitable concentration and adding the solution to the cooled suspension prepared in step (e) under stirring, or when ammonia gas is used, by blowing the ammonia gas into the reaction vessel under stirring. The amount of the basic compound may easily be decided by tracing the pH change of the solution. Usually, a sufficient amount is such that the pH of the solution is not lower than 7, and a preferred amount is such that the pH is between 7 and 9.

Basic compounds are especially useful to precipitate $Ce^{3+}$ ions which are dispersed in the suspension at the end of step (d) or (e) to form then $Ce(OH)_3$ precipitates.

In step (g), separation of the liquid medium from the precipitate, may be carried out, for example, by Nutsche filter method, centrifuging, filter pressing, or decantation. The precipitate may optionally be washed with water, preferably with water at basic pH, for example aqueous ammonia solution. Further, the precipitate may optionally be dried.

The suspension obtained in step (f) or the precipitate obtained in step (g) may be subjected to a step of heat treatment at a temperature comprised between 90 and 220° C., preferably between 100 and 180° C., more preferably between 110 and 160° C. The duration of the heat treatment is usually between 10 minutes and 48 hours, preferably between 30 minutes and 36 hours, more preferably between 1 and 24 hours.

It is also possible to add at any point between after step (c) and before step (h) of the process a rare earth element compound, for example a rare earth element in the form of nitrate, chloride, oxide, hydroxide, carbonate, halide, oxyhalide, oxynitrate, and/or sulfate. Rare earth element (REE) or rare earth metal is one of a set of seventeen chemical elements in the periodic table, meaning the fifteen lanthanides plus scandium and yttrium. Preferably, the rare earth element oxide are chosen in the group consisting of: lanthanium oxide ($La_2O_3$), praseodymium oxide ($Pr_6O_{11}$), neodymium oxide ($Nd_2O_3$) and yttrium oxide ($Y_2O_3$).

Cerium oxide particles obtained by the process of the invention may then comprise at least one rare earth element oxide, other than cerium oxide, for instance in a proportion comprised between 1 and 40% by weight of oxide, preferably in a proportion comprised between 1 and 20% by weight of oxide. Oxide refers there to final mixed oxide defined as integration of cerium oxide and rare earth element oxide.

In step (h), an organic texturing agent is added to the suspension obtained in the preceding step (f) or the precipitate obtained in step (g) once separated from the liquid medium.

An organic texturing agent usually refers to an organic compound, such as a surfactant, able to control or modify the mesoporous structure of the cerium oxide. "Mesoporous structure" basically describes a structure which specifically comprises pores with an average diameter comprised between 2 and 50 nm, described by the term "mesopores". Typically, these structures are amorphous or crystalline compounds in which the pores are generally distributed in random fashion, with a very wide pore-size distribution.

The organic texturing agent may be added directly or indirectly. It can be added directly to the suspension or precipitate resulting from the preceding step. It can also be first added in a composition, for instance comprising a solvent of the organic texturing agent, and said composition being then added to the suspension or precipitate as previously obtained.

The amount of organic texturing agent used, expressed as percentage by weight of additive relative to the weight of the cerium in terms of $CeO_2$, is generally between 5 and 100% and more particularly between 15 and 60%.

The organic texturing agent may be adsorbed on the surface of secondary particles and primary particles of the precipitates. For instance, the organic texturing agent adsorbed on the primary particles will lead to increase the size of mesopores and pore volume of the precipitate.

Organic texturing agents are preferably chosen in the group consisting of: anionic surfactants, nonionic surfactants, polyethylene glycols, carboxylic acids and their salts, and surfactants of the carboxymethylated fatty alcohol ethoxylate type. With regard to this additive, reference may be made to the teaching of application WO-98/45212 and the surfactants described in this document may be used.

As surfactants of anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, and sulfonates such as sulfosuccinates, and alkylbenzene or alkylnapthalene sulfonates.

As nonionic surfactants, mention may be made of acetylenic surfactants, alcohol ethoxylates, alkanolamides, amine oxides, ethoxylated alkanolamides, long-chain ethoxylated amines, copolymers of ethylene oxide/propylene oxide, sorbitan derivatives, ethylene glycol, propylene glycol, glycerol, polyglyceryl esters and ethoxylated derivatives thereof, alkylamines, alkylimidazolines, ethoxylated oils and alkylphenol ethoxylates. Mention may in particular be made of the products sold under the brands Igepal®, Dowanol®, Rhodamox® and Alkamide®.

With regard to the carboxylic acids, it is in particular possible to use aliphatic monocarboxylic or dicarboxylic acids and, among these, more particularly saturated acids. Fatty acids and more particularly saturated fatty acids may also be used. Mention may thus in particular be made of formic acid, acetic acid, propionic acid, butyric acid, isobutyric acid, valeric acid, caproic acid, caprylic acid, capric acid, lauric acid, myristic acid and palmitic acid. As dicarboxylic acids, mention may be made of oxalic acid, malonic acid, succinic acid, glutaric acid, adipic acid, pimelic acid, suberic acid, azelaic acid and sebacic acid.

Salts of the carboxylic acids may also be used, in particular the ammonium.

By way of example, mention may be made more particularly of lauric acid and ammonium laurate.

Finally, it is possible to use a surfactant which is selected from those of the carboxymethylated fatty alcohol ethoxylate type.

The expression "product of the carboxymethylated fatty alcohol ethoxylate type" is intended to mean products consisting of ethoxylated or propoxylated fatty alcohols comprising a $CH_2$—COOH group at the end of the chain.

These products may correspond to the formula:

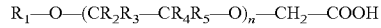

$$R_1-O-(CR_2R_3-CR_4R_5-O)_n-CH_2-COOH$$

in which $R_1$ denotes a saturated or unsaturated carbon-based chain of which the length is generally at most 22 carbon atoms, preferably at least 12 carbon atoms; $R_2$, $R_3$, $R_4$ and $R_5$ may be identical and may represent hydrogen or else $R_2$ may represent an alkyl group such as a $CH_3$ group and $R_3$, $R_4$ and $R_5$ represent hydrogen; n is a non-zero integer that may be up to 50 and more particularly between 5 and 15, these values being included. It will be noted that a surfactant may consist of a mixture of products of the formula above for which $R_1$ may be saturated or unsaturated, respectively, or alternatively products comprising both —$CH_2$—$CH_2$—O— and —$C(CH_3)$—$CH_2$—O— groups.

Optionally in step (i) the precipitate is separated off from the liquid medium, for example, by Nutsche filter method, centrifuging, or filter pressing. The precipitate may optionally be washed with an aqueous solution, preferably with water at basic pH, for example aqueous ammonia solution. Further, the precipitate may optionally be dried to a suitable extent for improving the efficiency in the following step.

In step (j), the precipitate obtained in the preceding step is calcined to obtain the cerium oxide particles which are the object of the invention.

Process of the invention then comprises either a step (g) of separation of the liquid medium from the precipitate, either a step (i) separating off the precipitate from the liquid medium, or both step (g) and step (i); in order to proceed with calcination of the precipitate obtained at the end of step (h) or obtained at step (i) to obtain cerium oxide particles.

In step (j), the calcination temperature may suitably be selected from the range of usually between 250 and 900° C. The selection of the temperature may be made as desired, depending on the required values of the specific surface area and bulk density. From a practical point of view to prepare a catalyst or a co-catalyst material wherein the specific surface area is important, the calcination temperature in step (j) may preferably be between 250 and 800° C., more preferably between 250 and 700° C., most preferably between 280 and 450° C. The duration of calcination may suitably be determined depending on the temperature, and may preferably be between 1 and 20 hours.

After step (j), the cerium oxide particles obtained may usually be pulverized. The pulverization may sufficiently be performed in an ordinary pulverizer, such as a hammer mill, to obtain a powder of a desired particle size. The cerium oxide obtained by the present method may be given a desired particle size through the above mentioned pulverization. For use as a co-catalyst in a catalyst for purifying exhaust gas, for example, a preferred average particle size of the cerium oxide is between 0.5 and 50 µm.

Cerium oxide particles of the present invention have the following properties:
  a specific surface area (SBET) comprised between 80 and 120 m²/g after calcination at 800° C. for 2 hours, under air; preferably comprised between 90 and 120 m²/g.
  a specific surface area (SBET) comprised between 55 and 80 m²/g after calcination at 900° C. for 5 hours, under air; preferably comprised between 60 and 80 m²/g.

a total pore volume comprised between 0.9 and 1.6 ml/g after calcination at 800° C. for 2 hours, under air; preferably comprised between 1.1 and 1.6 ml/g.

a total pore volume comprised between 0.85 and 1.5 ml/g after calcination at 900° C. for 5 hours, under air; preferably comprised between 1.0 and 1.5 ml/g.

The total pore volume may be measured by ordinary mercury porosimeter.

Cerium oxide particles may have a S1/S2 ratio comprised between 0.5 and 0.7 taken after calcination at 800° C. for 2 hours. Cerium oxide particles may have a S1/S2 ratio comprised between 0.3 and 0.5 taken after calcination at 900° C. for 5 hours.

Said S1/S2 ratio is a ratio of the area (S1) defined by a baseline and a TPR curve in a temperature range of 200 to 600° C. to the area (S2) defined by said baseline and said TPR curve in a temperature range of 600 to 1000° C. A higher S1/S2 ratio of a cerium oxide is expected to result in a higher oxygen absorbing and desorbing capability and higher activity to purify exhaust gas at a lower temperature. As used herein, the "baseline" means a line segment drawn from the point on the TPR curve corresponding to 200° C. in a parallel to the axis representing temperature, up to 1000° C.

The cerium oxide of the present invention may preferably be prepared by the production method according to the present invention to be discussed below, with good reproducibility and in an economical manner.

Cerium oxide particles may also comprise at least one rare earth element oxide, other than cerium oxide, for instance in a proportion comprised between 1 and 40% by weight of oxide, preferably in a proportion comprised between 1 and 20% by weight of oxide. Oxide refers there to final mixed oxide defined as integration of cerium oxide and rare earth element oxide.

Cerium oxide particles as described above or as obtained by means of the preparation process previously described may be in the form of powders, but they can optionally be formed so as to be in the form of granules, pellets, foams, beads, cylinders or honeycombs of variable dimensions.

The present invention also concerns a catalyst comprising at least cerium oxide particles as previously defined, such as a catalyst for purifying exhaust gas.

Cerium oxide particles of the invention may be applied as such or within a composition to any support commonly used in the field of catalysis, that is to say in particular thermally inert supports. This support can be chosen from alumina, titanium oxide, cerium oxide, zirconium oxide, silica, spinels, zeolites, silicates, crystalline silicoaluminum phosphates or crystalline aluminum phosphates.

The catalyst for purifying exhaust gas according to the present invention may be of any type, as long as it has a co-catalyst containing the cerium oxide of the present invention. The catalyst may be produced, for example, by a commonly known method and with commonly known other materials.

The invention also concerns a composition, preferably a liquid composition, comprising at least cerium oxide particles as previously obtained and defined. More preferably said composition is a suspension comprising at least a liquid medium and cerium oxide particles as previously obtained and defined.

According to an embodiment of the invention, the invention also relates to the use of cerium oxide particles as defined and/or as obtained in the above identified process for the polishing application. For instance, a composition, such as a suspension, for polishing comprising at least the cerium oxide particles of the invention may be obtained. This composition can be used for polishing glass, for example in the crystal-making or mirror industry, flat glass, television screens or spectacles, or else for polishing ceramics or other materials of vitreous type. This composition can also be used most particularly for CMP-type polishing in the electronics industry and therefore for polishing metal substrates which go to make up microprocessors, but also for polishing insulating layers or Interlayer Dielectric (ILD) layers of these same microprocessors, the suspension of the invention being particularly suitable for the polishing of said layers. Chemical mechanical planarization (CMP) is a key process enabling Shallow Trench Isolation (STI), which is used in current integrated circuit manufacturing processes to achieve device isolation. These layers are generally made of silica, such as doped silica or porous silica. This suspension may also be used for metal CMP for wiring and barrier in integrated circuit, polishing a photomask substrate, especially made of a synthetic quartz glass.

In general, such compositions comprise, in addition to the compound with abrasive property, such as the oxide particles, additives such as a dispersing agent and/or an oxidant.

The present invention also concerns a method of removing a portion of a substrate, for instance in a CMP operation, comprising:

providing at least a composition, for instance a suspension, comprising cerium oxide particles of the invention, contacting at least the composition and the substrate to be polished, and performing the polishing on the substrate.

The following examples are included to illustrate embodiments of the invention. Needless to say, the invention is not limited to described examples.

EXPERIMENTAL PART

Example 1

50 g of a ceric nitrate solution in terms of $CeO_2$ containing not less than 90 mol % tetravalent cerium caions was measured out, and adjusted to a total amount of 1 L with deionized water. The obtained solution was heated to 100° C., maintained at this temperature for 30 minutes, and allowed to cool down to 25° C., to thereby obtain a cerium suspension.

After the mother liquor was removed from the cerium suspension thus obtained, the total volume was adjusted to 1 L with deionized water; concentration of anions is hence decreased by 44%, in comparison with anions comprised in the liquid medium after heating.

Then the cerium suspension was maintained at 120° C. for 2 hours, allowed to cool, and neutralized to pH 8.5 with aqueous ammonia.

To a slurry resulting from the neutralization, 12.5 g of lauric acid was added, and stirred for 60 minutes.

The obtained slurry was subjected to solid-liquid separation through a Nutsche filter to obtain a filter cake. The cake was calcined in the air at 300° C. for 10 hours to obtain cerium oxide powder.

The obtained composite oxide powder was measured of the specific surface area by the BET method after calcination at 800° C. for 2 hours and at 900° C. for 5 hours.

Example 2

A cerium oxide powder was prepared in the same way as in Example 1 except that the concentration of anions is decreased by 39%, in comparison with anions comprised in the liquid medium after heating.

The properties of the oxide powder thus obtained were evaluated in the same way as in Example 1.

Example 3

A cerium oxide powder was prepared in the same way as in Example 1 except that 12.5 g of capric acid instead of lauric acid was added.

The properties of the oxide powder thus obtained were evaluated in the same way as in Example 1.

Comparative Example 1

A cerium oxide powder was prepared in accordance with the method disclosed in Patent Publication U.S. Pat. No. 7,361,322 B2.

20 g of a ceric nitrate solution in terms of $CeO_2$ containing not less than 90 mol % tetravalent cerium cations was measured out, and adjusted to a total amount of 1 L with deionized water. The obtained solution was heated to 100° C., maintained at this temperature for 24 hours, and allowed to cool down to the room temperature. Then aqueous ammonia was added to neutralize to pH 8 to obtain cerium oxide hydrate in the form of the slurry. The slurry was then subjected to solid-liquid separation with a Nutsche filter to obtain a filter cake. The cake was calcined in the air at 300° C. for 10 hours to obtain cerium oxide powder.

The properties of the oxide powder thus obtained were evaluated in the same way as in Example 1.

Comparative Example 2

A cerium oxide was prepared in the same way as in Comparative Example 1 except that the 5.0 g of lauric acid was added after addition of aqueous ammonia, and stirred for 60 minutes.

Comparative Example 3

A cerium oxide was prepared in the same way as in Comparative Example 1 except that the mother liquor was removed after obtaining a cerium suspension.

Comparative Example 4

A cerium oxide was prepared in the same way as in Example 1 except that the mother liquor was not removed after obtaining a cerium suspension.

Properties of the cerium oxides prepared in the above defined examples are mentioned in Table 1.

Description of Analysis Method

BET: The Specific surface area is measured by BET method in the following way. Use is made of a Mountech Co., LTD. Macsorb analyzer with a 200 mg sample which has been calcined beforehand at 800° C. for 2 hours or 900° C. for 5 hours under air.

TPR: The TPR is performed using a temperature programmed desorption analyzer manufactured by Okura Riken Co., LTD. with a carrier gas containing 90% argon and 10% hydrogen, at a gas flow rate of 30 ml/min, at a heating rate of a sample during measurement of 13.3° C./min, and using 0.5 g of a sample which has been calcined beforehand at 800° C. for 2 hours or 900° C. for 5 hours under air.

S1/S2 ratio, that is, a ratio of the area (S1) defined by the baseline and the TPR curve in the temperature range of 200 to 600° C., to the area (S2) defined by the baseline and the TPR curve in the temperature range of 600 to 1000° C.

The TRP curve is expressed in TCD (Thermal Conductivity Detector) signal for Y axis and in temperature for X axis. A higher S1/S2 ratio of a cerium oxide relates to a higher oxygen absorbing and desorbing capability and higher activity to purify exhaust gas at a lower temperature. As used herein, the "baseline" means a line segment drawn from the point on the TPR curve corresponding to 200° C. in a parallel to the axis representing temperature, up to 1000° C.

Hg porosity: The total pore volume is measured by mercury intrusion porosimetry in the following way. Use is made of a Micromeritics AutoPore IV 9500 with a 200 mg sample which has been calcined beforehand at 800° C. for 2 hours or 900° C. for 5 hours under air.

Example 2: Low Temperature NOx Storage Capacity Testing

Cerium oxides of example 1 and comparative example 1 are calcined under air at 800° C. for 4 h. The NOx storage capacity is then measured in the following way: a synthetic gas mixture (30 L/h), representative of the catalytic process with the composition A is flushed during 90 min at 120° C. through 150 mg of cerium oxide placed in a fixed bed reactor. The amount of NOx stored is monitored on line in function of the time, owing to an Antaris IGS FTIR Spectrometer.

| | Composition A |
|---|---|
| | (vol %) |
| NO | 0.014 |
| $NO_2$ | 0.018 |

TABLE 1

| | SBET 800° C./2 h ($m^2$/g) | SBET 900° C./5 h ($m^2$/g) | TPR S1/S2 800° C./2 h | TPR S1/S2 900° C./5 h | Total pore volume 800° C./2 h (ml/g) | Total pore volume 900° C./5 h (ml/g) |
|---|---|---|---|---|---|---|
| Inv. 1 | 92 | 60 | 0.537 | 0.342 | 1.25 | 1.16 |
| Inv. 2 | 87 | 62 | 0.530 | 0.350 | 1.18 | 1.22 |
| Inv. 3 | 101 | 57 | 0.544 | 0.343 | 1.31 | 1.19 |
| Comp. 1 | 75 | 46 | 0.488 | 0.259 | 0.73 | 0.72 |
| Comp. 2 | 78 | 47 | 0.469 | 0.271 | 0.82 | 0.78 |
| Comp. 3 | 77 | 44 | 0.479 | 0.253 | 0.71 | 0.68 |
| Comp. 4 | 73 | 48 | 0.463 | 0.268 | 0.79 | 0.77 |

-continued

| Composition A | |
|---|---|
| | (vol %) |
| $H_2O$ | 5 |
| $CO_2$ | 5 |
| $O_2$ | 10 |
| $N_2$ | balance |

NOx adsorption of both cerium oxides of example 1 and comparative example 1 at 90 mins is shown in Table 2:

TABLE 2

| | NOx adsorbed (µg NOx/g Ce oxide) |
|---|---|
| Ex. 1 | 23.93 |
| Comp. 1 | 21.52 |

It appears then that the cerium oxide of the present invention has a higher NOx capture performance than conventional cerium oxide. NSC (NOx storage capacity) is an indicator to evaluate the NOx emission performance.

The invention claimed is:

1. Cerium oxide particles having the following properties:
a specific surface area (SBET) comprised between 80 and 120 $m^2/g$ after calcination at 800° C. for 2 hours, under air;
a specific surface area (SBET) comprised between 55 and 80 $m^2/g$ after calcination at 900° C. for 5 hours, under air;
a total pore volume comprised between 0.9 and 1.6 ml/g after calcination at 800° C. for 2 hours, under air;
a total pore volume comprised between 0.85 and 1.5 ml/g after calcination at 900° C. for 5 hours, under air; and
a S1/S2 ratio comprised between 0.3 and 0.5 taken after calcination at 900° C. for 5 hours,
wherein S1 is the area defined by a baseline and a TPR curve in a temperature range of 200 to 600° C. and S2 is the area defined by said baseline and said TPR curve in a temperature range of 600 to 1000° C.,
wherein the baseline is a line segment drawn from a point on the TPR curve corresponding to 200° C., parallel to the temperature axis, up to 1000° C., and wherein the TPR curve is the result of temperature programmed reduction of said particles using a temperature programmed desorption analyzer with a carrier gas containing 90% argon and 10% hydrogen at a gas flow rate of 30 ml/min and at a heating rate of 13.3° C./min.

2. Cerium oxide particles according to claim 1, wherein said cerium oxide particles comprise at least one rare earth element oxide, other than cerium oxide.

3. A catalyst comprising at least cerium oxide particles according to claim 1.

4. The catalyst according to claim 3 wherein said catalyst is a co-catalyst comprising the cerium oxide particles, for purifying exhaust gas.

5. A catalyst comprising at least cerium oxide particles according to claim 2.

6. The catalyst according to claim 5 wherein said catalyst is a co-catalyst comprising the cerium oxide particles, for purifying exhaust gas.

7. A composition comprising at least cerium oxide particles according to claim 1.

8. Composition according to claim 7, wherein said composition is a suspension comprising at least a liquid medium and the cerium oxide particles.

9. A composition comprising at least cerium oxide particles according to claim 2.

10. Composition according to claim 9, wherein said composition is a suspension comprising at least a liquid medium and the cerium oxide particles.

11. A method of removing a portion of a substrate, comprising:
providing at least a composition comprising cerium oxide particles according to claim 1,
contacting at least the composition and the substrate to be polished, and
polishing the substrate.

12. A method of removing a portion of a substrate, comprising:
providing at least a composition comprising cerium oxide particles according to claim 2,
contacting at least the composition and the substrate to be polished, and
polishing the substrate.

* * * * *